US011109390B2

(12) United States Patent
Wang et al.

(10) Patent No.: US 11,109,390 B2
(45) Date of Patent: *Aug. 31, 2021

(54) DEVICE-TO-DEVICE PRIORITY POOL CONFIGURATION

(71) Applicant: TELEFONAKTIEBOLAGET LM ERICSSON (PUBL), Stockholm (SE)

(72) Inventors: Min Wang, Luleå (SE); Mats Folke, Vällingby (SE); Stefan Wänstedt, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/533,747

(22) Filed: Aug. 6, 2019

(65) Prior Publication Data

US 2019/0364576 A1 Nov. 28, 2019

Related U.S. Application Data

(63) Continuation of application No. 15/150,698, filed on May 10, 2016, now Pat. No. 10,420,119.

(60) Provisional application No. 62/161,972, filed on May 15, 2015.

(51) Int. Cl.
*H04W 72/10* (2009.01)
*H04W 72/04* (2009.01)
*H04W 72/08* (2009.01)

(52) U.S. Cl.
CPC .......... *H04W 72/10* (2013.01); *H04W 72/04* (2013.01); *H04W 72/085* (2013.01)

(58) Field of Classification Search
CPC .... H04W 72/04; H04W 72/085; H04W 72/10
See application file for complete search history.

(56) References Cited

U.S. PATENT DOCUMENTS

| 10,420,119 B2 * | 9/2019 | Wang ................. H04W 72/085 |
| 2005/0180385 A1 | 8/2005 | Jeong et al. |
| 2015/0009910 A1 | 1/2015 | Ryu et al. |

(Continued)

OTHER PUBLICATIONS

LG Electronics Inc: Resource pool selection with group priority. 3GPP Draft; R2-145078 [D2D-C] Resource Pool Selection With Group Priority. 3rd Generation Partnership Project (3GPP). Mobile Competence Centre . 650. Route Des Lucioles, F-06921 Sophia-Antipolis Cedex vol. RAN WG2. No. San Francisco. USA; Nov. 17, 2014-Nov. 21, 2014. Nov. 17, 2014.

(Continued)

*Primary Examiner* — Kevin C. Harper
*Assistant Examiner* — Derrick V Rose

(57) ABSTRACT

According to some embodiments, a method of device-to-device (D2D) communication in a wireless communication network comprises a wireless device determining a division of a set of resources allocated for D2D communication into a plurality of regions. Each region of the plurality of regions is associated with a priority level, and the set of resources comprises a plurality of resource pools. Using a priority of the first wireless device and the division of the set of resources, the first wireless device determines one or more resources from the plurality of resource pools for transmission of a communication from the wireless device. The wireless device transmits the communication to another wireless device using the determined one or more resources.

10 Claims, 8 Drawing Sheets

(56) References Cited

U.S. PATENT DOCUMENTS

2017/0188375 A1 6/2017 Seo et al.
2017/0245295 A1 8/2017 Jung et al.

OTHER PUBLICATIONS

Sony: Communication Resource Allocation Mode Capability and Resource Pool Signalling Implications. 3GPP Draft; R2-144396 D2D Capabilities. 3rd Generation Partnership Project (3GPP). Mobile Competence Centre ; 650. Route Des Lucioles ; F-06921 Sophia-Antipolis Cedex; France. vol. RAN WG2. No. Shanghai. China; Oct. 6, 2014-Oct. 10, 2014. Oct. 5, 2014.

* cited by examiner

DEVICE-TO-DEVICE PRIORITY POOL CONFIGURATION

PRIORITY CLAIM

This application is a continuation of pending U.S. application Ser. No. 15/150,698, filed May 10, 2016, which claims the benefit of U.S. Application No. 62/161,972, filed May 15, 2015, the disclosures of which are fully incorporated herein by reference.

RELATED APPLICATION

This application claims benefit under 35 U.S.C. § 119(e) to U.S. Provisional Application Ser. No. 62/161,972, entitled "PROSE GROUP PRIORITY POOL CONFIGURATION," filed May 15, 2015, the entire content of which is incorporated herein by reference.

TECHNICAL FIELD

Particular embodiments relate generally to wireless communications networks, and more particularly to group priority pool configuration for device-to-device (D2D) communications, such as proximity services (ProSe) or vehicular communication.

BACKGROUND

Device-to-device (D2D) communication is a well-known and widely used component of many existing wireless technologies, including ad hoc and cellular networks. Examples include Bluetooth and several variants of the IEEE 802.11 standards suite, such as WiFi Direct. These systems operate in unlicensed spectrum. The Third Generation Partnership Project (3GPP) Long Term Evolution (LTE) specifications refer to D2D communications as sidelink communications.

D2D communication as an underlay to cellular networks allows devices to operate in a controlled interference environment and may also take advantage of the proximity of communicating devices, sometimes referred to as proximity services (ProSe). Typically, D2D communication shares the same spectrum as the cellular system. For example, a portion of the cellular uplink resources may be reserved for device-to-device purposes. Allocating dedicated spectrum for device-to-device purposes is not a likely scenario, however, because spectrum is a scarce resource. Dynamic sharing between the device-to-device services and cellular services is a more likely scenario because it is more flexible and provides higher spectrum efficiency.

D2D transmissions may include various transmissions modes. For example, D2D transmission modes include unicast (i.e., a specific user equipment (UE) is the receiver), multicast or groupcast (i.e., a group of UEs are the receivers), and broadcast (i.e., all UE are the receivers).

Where there is no cellular network D2D communication (e.g., devices are out-of-coverage or off-network), data may be sent from one device to another device without prior arrangement. This may reduce transmission overhead and increase the communication capacity, which is crucial in emergency situations. A source device transmits data to one (unicast) or more (multicast/groupcast/broadcast) other devices, without first ensuring that the recipients are available and ready to receive the data. Such communication may be used for one-to-one or one-to-many communication, but it is particularly effective for multicast and broadcast transmissions. Thus, it is well-suited for broadcast and group communication. The communication may be realized, for example, via PHY unicast/multicast/groupcast/broadcast transmissions. Even using PHY broadcast transmissions, higher layers may still treat the transmissions as unicast/groupcast/multicast transmissions. For example, in the MAC layer, multicast or even unicast addresses may be used. Alternatively, if using broadcast on both PHY and MAC, multicast or unicast IP addresses may be used at the IP layer.

One way to provide D2D communication is to send a scheduling assignment (SA) followed by a data transmission. SAs are control messages used for direct scheduling of D2D communication. SAs are transmitted by a UE that intends to transmit D2D data, and they are received by UEs that are potentially interested in such data. A UE transmits SAs on dedicated resources characterized by time and frequency. These are typically a sparse resource. SAs provide information that the receiver can use to decode the D2D data transmission associated with the SA (e.g., the resources for data transmission, the modulation/coding parameters, timing information, identities for the transmitter and/or receiver, etc.). Typically, but not necessarily, SAs are transmitted prior to the actual data transmission, so that a receiver is able to selectively receive data based on the content of the SAs. The data transmissions scheduled by a SA may be referred to as a "transmission pattern."

For data transmission between UEs that are both out-of-coverage or operating off-network (e.g., a situation where the UEs control the transmission with little or no help, such as scheduling, from the network), UEs may be preconfigured with certain parameters such as resource pool information (e.g., time and frequency configuration) used for data transmission. When UE-A has data to transmit to UE-B, UE-A typically sends a sync signal, which UE-B may use as a time reference. Then UE-A transmits a scheduling assignment followed by the actual data.

Some scenarios assume that the frequency resource for data transmission is the same frequency resource as for transmitting scheduling assignments. The time resource for data is provided by the time-pattern information element in the SA itself.

A UE may support discontinuous reception (DRX) by monitoring the identities carried in the SA. For example, for multicast D2D communication, the identity in the SA identifies the multicast group. Thus, a UE which is interested in receiving data for one or several multicast groups only needs to check the SAs for the corresponding identities. When the UE receives an SA with an identity corresponding to a multicast group of interest to the UE, the UE may decode the data transmission associated with the SA.

When the transmitting and receiving UEs are within coverage of a cellular network, the communicating UEs cannot rely on the aforementioned pre-configuration because the D2D transmissions need to coexist with potential legacy uplink transmissions. Therefore, the transmitting D2D UE (e.g., UE-A described above) requests transmission resources from a base station, such as an eNB. As part of requesting the transmission resources, the UE notifies the eNB that the UE has data to send by transmitting a buffer status report (BSR).

D2D communication defines resource pools to support both communication and discovery. The pools for communication may also be referred to as transmission pools or data transmission pools. A UE can be configured with multiple transmission pools. More specifically, at any given time a UE has up to 4 mode-2 SA and data transmission pools that may be available for selection at L1.

The layers above L1 need to specify how to use the L1 resource pools. As one example, mission critical prioritization of public safety communication can benefit from ProSe Group Priority. Current strategies for prioritizing resource pools comprise static mappings of priorities to pools. A risk with these strategies is that certain pools may be underutilized, or not used at all. Another risk is that certain pools may be over utilized. For example, certain pools may carry too much traffic, resulting in congestion, even though resources are available in other pools.

SUMMARY

The embodiments described herein include dynamic prioritization of device-to-device (D2D) resource pools. Particular embodiments configure the resource pools so that pool priorities may overlap according to particular rules. For example, if no high priority users are communicating, all D2D resources may be available to all users. If users with a mix of priorities are communicating, the network may reserve portions of each resource pool for users with a particular priority.

In particular embodiments, the network may define multiple resource pool configurations. At any given time period, however, only one configuration may be in use. The determination of which configuration is in use may be based on a load associated with devices of a certain priority. In each resource pool, a portion of resources may be reserved for devices with certain priority (which may be associated with a particular group). The portion of the resource pool may be defined according to the device (group) priority of the device that is requesting resources. A particular advantage of these embodiments is that all resources configured for D2D communication may be possible to use at all times. This is facilitated by the dynamic configuration of resource pools.

According to some embodiments, a method of D2D communication in a wireless communication network comprises a wireless device determining a division of a set of resources allocated for D2D communication into a plurality of regions. Each region of the plurality of regions is associated with a priority level, and the set of resources comprises a plurality of resource pools. Using a priority of the first wireless device and the division of the set of resources, the first wireless device determines one or more resources from the plurality of resource pools for transmission of a communication from the wireless device. The wireless device transmits the communication to another wireless device using the determined one or more resources.

In particular embodiments, each region of the plurality of regions comprises at least one resource from each resource pool of the plurality of resource pools. A first region of the plurality of regions may comprise a different percentage of resources from each resource pool of the plurality of resource pools. The plurality of regions and the plurality of resource pools may be configured such that each region includes at least some resources in each resource pool of the plurality of resource pools and such that the resources of each resource pool of the plurality of resource pools are associated with a primary priority level such that the majority of the resources of a resource pool are assigned to a region associated with a priority level corresponding to the primary priority level of the resource pool.

In particular embodiments, determining the division of the set of resources allocated for D2D communication comprises the wireless device selecting the division based on a predetermined rule or pattern. In other embodiments, determining the division of the set of resources allocated for D2D communication comprises the wireless device receiving the division from a network node.

In particular embodiments, the wireless device determines that a load associated with the set of resources allocated for D2D communication exceeds a threshold and modifies the division of the set of resources allocated for D2D communication based on the load. The wireless device may detect the load and modify the division of the set of resources allocated for D2D communication. In other embodiments, the wireless device may receive a notification from a network node and receive the division of the set of resources allocated for D2D communication from the network node.

According to some embodiments, a method of D2D communication in a wireless communication network comprises a network node determining a division of a set of resources allocated for D2D communication into a plurality of regions. Each region of the plurality of regions is associated with a priority level, and the set of resources comprises a plurality of resource pools. The network node communicates the division of the set of resources allocated for D2D communication to a wireless device.

In particular embodiments, the network node determines that a load associated with the set of resources allocated for D2D communication exceeds a threshold and modifies the division of the set of resources allocated for D2D communication based on the load. The network node may communicate the modified division of the set of resources allocated for D2D communication to the wireless device.

According to some embodiments, a wireless device capable of D2D communication in a wireless communication network comprises a processor and a memory. The processor is operable to determine a division of a set of resources allocated for D2D communication into a plurality of regions. Each region of the plurality of regions is associated with a priority level, and the set of resources comprises a plurality of resource pools. The processor is further operable to determine, using a priority of the wireless device and the division of the set of resources, one or more resources from the plurality of resource pools for transmission of a communication from the first wireless device and transmit the communication using the determined one or more resources.

According to some embodiments, a network node in a wireless communication network comprises a processor and a memory. The processor is operable to determine a division of a set of resources allocated for D2D communication into a plurality of regions. Each region of the plurality of regions is associated with a priority level, and the set of resources comprises a plurality of resource pools. The processor is further operable to communicate the division of the set of resources allocated for D2D communication to a wireless device.

According to some embodiments, a wireless device capable of D2D communication in a wireless communication network comprises a division determining module, a resource determining module, and a transmitting module. The division determining module is operable to determine a division of a set of resources allocated for D2D communication into a plurality of regions. Each region of the plurality of regions is associated with a priority level, and the set of resources comprises a plurality of resource pools. The resource determining module is operable to determine, using a priority of the wireless device and the division of the set of resources, one or more resources from the plurality of resource pools for transmission of a communication from the first wireless device. The transmitting module is operable to transmit the communication using the determined one or more resources.

In particular embodiments, the wireless device further comprises a load determining module. The load determining module is operable to determine that a load associated with the set of resources allocated for D2D communication exceeds a threshold. The load determining module may cause the division determining module to modify the division of the set of resources allocated for D2D communication based on the load.

According to some embodiments, a network node in a wireless communication network comprises a division determining module and a transmitting module. The division determining module is operable to determine a division of a set of resources allocated for D2D communication into a plurality of regions. Each region of the plurality of regions is associated with a priority level, and the set of resources comprises a plurality of resource pools. The transmitting module is operable to communicate the division of the set of resources allocated for D2D communication to a wireless device.

In particular embodiments, the network node further comprises a load determining module. The load determining module is operable to determine that a load associated with the set of resources allocated for D2D communication exceeds a threshold. The load determining module may cause the division determining module to modify the division of the set of resources allocated for D2D communication based on the load. The transmitting module may communicate the modified division of the set of resources allocated for D2D communication to the wireless device.

Also disclosed is a computer program product. The computer program product comprises instructions stored on non-transient computer-readable media which, when executed by a processor, performs the act of determining a division of a set of resources allocated for D2D communication into a plurality of regions. Each region of the plurality of regions is associated with a priority level, and the set of resources comprises a plurality of resource pools. The instructions, when executed, further perform the acts of determining, using a priority of the first wireless device and the division of the set of resources, one or more resources from the plurality of resource pools for transmission of a communication from the wireless device; and transmitting the communication to another wireless device using the determined one or more resources.

Another computer program product comprises instructions stored on non-transient computer-readable media which, when executed by a processor, performs the act of determining a division of a set of resources allocated for D2D communication into a plurality of regions. Each region of the plurality of regions is associated with a priority level, and the set of resources comprises a plurality of resource pools. The instructions, when executed, further perform the act of communicating the division of the set of resources allocated for D2D communication to a wireless device.

Particular embodiments may exhibit some of the following technical advantages. In particular embodiments, the network may predictably control the prioritization and allocation of D2D communication and discovery resource pools. This facilitates a network node configuring D2D resources to satisfy a network operator's performance requirements. For example, dynamic configuration of pools maximizes the resources available for D2D communication. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
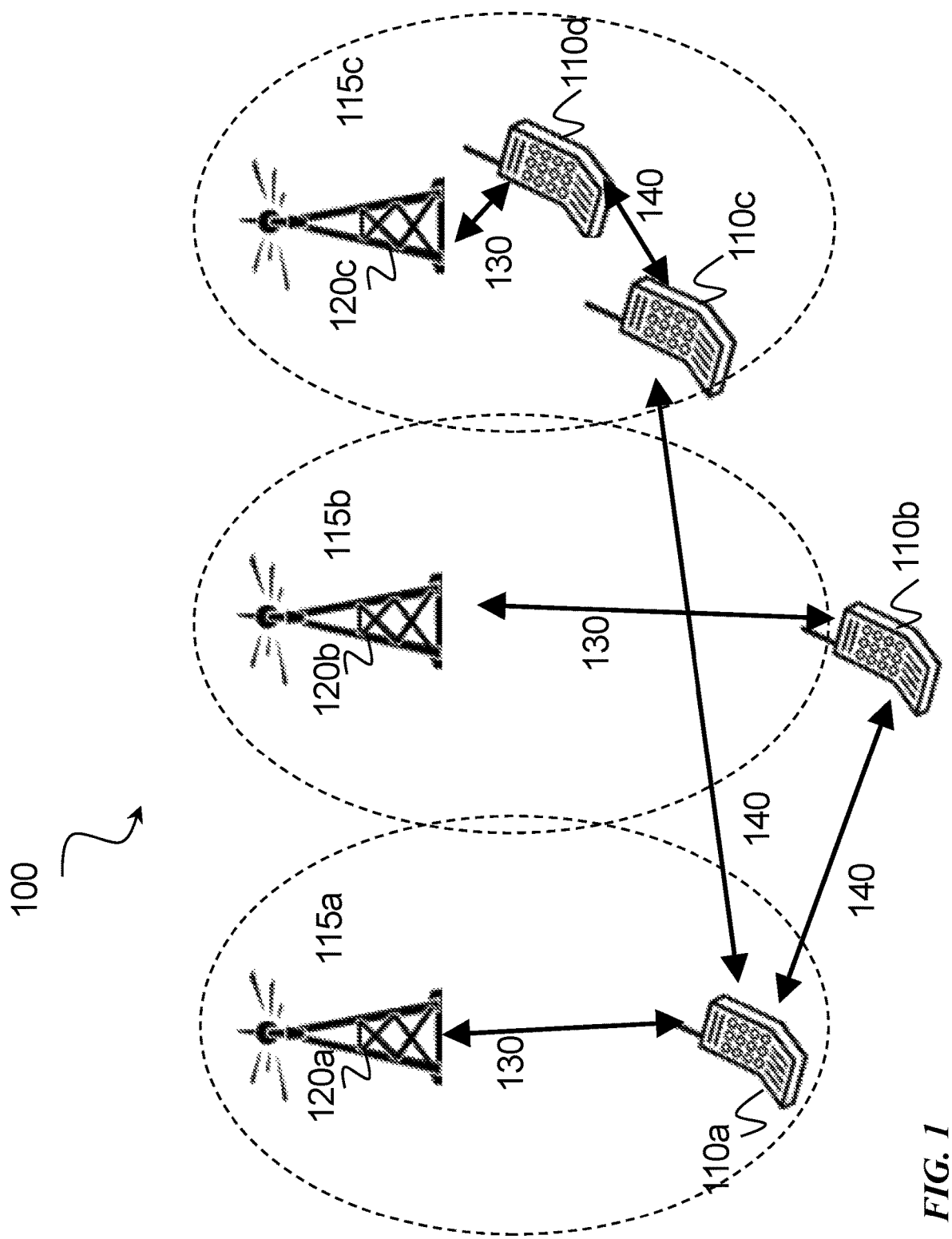
FIG. 1 is a block diagram illustrating an example wireless network, according to a particular embodiment.

Device-to-device (D2D) communications, such as public safety communication or vehicle-to-vehicle communication, may benefit from proximity services (ProSe) group priority. Conventional strategies for prioritizing resource pools comprise static mappings of priorities to pools. A particular risk with static mappings is that particular pools may be over or underutilized. For example, certain pools may carry too much traffic (i.e., high load), resulting in congestion, even though resources are available in other pools.

Particular embodiments obviate the problems described above and include dynamic prioritization of device-to-device (D2D) resource pools. Particular embodiments configure the resource pools so that pool priorities may overlap according to particular rules. For example, if no high priority users are communicating, all D2D resources may be available to all users. If users with a mix of priorities are communicating, the network may reserve portions of each resource pool for users with a particular priority.

In particular embodiments, the network may define multiple resource pool configurations. At any given time period, however, only one configuration may be in use. The determination of which configuration is in use may be based on a load associated with devices of a certain priority. In each resource pool, a portion of resources may be reserved for devices with certain priority (which may be associated with a particular group). The portion of the resource pool may be defined according to the device (group) priority of the device that is requesting resources. A particular advantage of these embodiments is that the network may predictably control the prioritization and allocation of D2D communication and discovery resource pools. This facilitates a network node configuring D2D resources to satisfy a network operator's performance requirements. For example, dynamic configuration of pools maximizes the resources available for D2D communication.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 1-8B of the drawings, like numerals being used for like and corresponding parts of the various drawings. LTE is used throughout this disclosure as an example cellular system, but the ideas presented herein may apply to other wireless communication systems as well.

FIG. 1 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Radio network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from radio network node 120 to wireless devices 110) and uplink transmissions (from wireless devices 110 to radio network node 120).

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Wireless devices 110 may communicate with each other (i.e., D2D operation) by transmitting and receiving wireless signals 140. For example, wireless device 110a may communicate with wireless device 110b using wireless signal 140. Wireless signal 140 may also be referred to as sidelink 140. Communication between two wireless devices 110 may be referred to as D2D communication or sidelink communication.

In particular embodiments, wireless signal 140 may use a different carrier frequency than the carrier frequency of wireless signal 130. For example, wireless device 110a may communicate with network node 120a using a first frequency band and may communicate with wireless device 110b using the same frequency band or a second frequency band. Wireless devices 110a and 110b may be served by the same network node 120 or by different network nodes 120. In particular embodiments, one or both of network nodes 110a and 110b may be out-of-coverage of any network node 120.

In particular embodiments, wireless devices 110 may communicate with each other using particular time and frequency resources. The time and frequency resources are shared among both the D2D communications (i.e., between wireless devices 110) and the cellular communications (i.e., between wireless device 110 and network node 120). For example, particular embodiments may reserve some of the cellular uplink resources for D2D communication.

In particular embodiments, D2D time and frequency resources may include pooled resources. For example, particular LTE embodiments may define a number of pools (e.g., four) available for sending data transmissions. To transmit data, wireless device 110 may use one or more resources (e.g., time and/or frequency resources) from one of the D2D resource pools. When wireless device 110 is in communication with network node 120, wireless device 110 may receive one more pool configurations from network node 120. When wireless device 110 is out-of-coverage, wireless device 110 may rely on preconfigured D2D pools.

In particular embodiments, wireless device 110 may be associated with a priority. For example, wireless device 110 using push-to-talk (PTT) by an emergency responder at the site of an ongoing emergency may have a higher priority than wireless device 110 comprising a D2D enabled temperature sensor located in the same building as the ongoing emergency. In particular embodiments, wireless device 110 may include a static priority. For example, priority may be based on static attributes of the user such as rank, subscription, or public safety or an attribute of the device, such as a sensor. In some embodiments, wireless device 110 may include dynamic priority. For example, priority may be based on dynamic attributes such as a geographical location, a current situation such as an emergency situation, or the type of data to transmit. In particular embodiments, wireless device 110 may be associated with a group and wireless device 110 may derive its priority from a priority associated with the group.

In some embodiments, wireless device 110 may use its priority when determining which resources from the pools of resources wireless device 110 may use for D2D communication. For example, particular pools, or resources within pools, may be associated with a particular priority level. Wireless device 110 may compare its priority with the priority level associated with the resources when determining which resources to use for D2D communication. Particular configurations of resource pools are described in more detail below with respect to FIGS. 2-4.

In particular embodiments, wireless device 110 or network node 120 may modify a resource pool configuration based on network load. For example, wireless device 110 or network node 120 may select a first configuration if all wireless devices 110 communicating in the network are the same priority. In the first configuration, none of the pool resources may be associated with a priority or all pool resources may be associated with the same priority. In this configuration, all wireless devices 110 share equal access to the pooled resources.

As another example, wireless device 110 or network node 120 may detect wireless devices 110 with multiple priorities communicating in the network. In this situation, wireless device 110 or network node 120 may select a second resource pool configuration. The second configuration may divide the resource pools into regions where each region may be associated with a particular priority. The regions may provide more resources for higher priority users than lower priority users.

In wireless network 100, each radio network node 120 may use any suitable radio access technology, such as long term evolution (LTE), LTE-Advanced, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 7A below. Similarly, a network node may include any suitable combination of hardware and/or software. For example, in particular embodiments, a network node, such as network node 120, may include the components described with respect to FIG. 8A below.

Particular embodiments include dynamic prioritization of D2D resource pools. Particular embodiments may configure the resource pools according to particular rules. For example, a D2D resource pool configuration for an out-of-coverage (off-network) scenario may provide high priority users access to all resources. Users of a lower level of priority may have access to all resources, except for a portion of the resources dedicated to the highest priority users, etc.

If all users in the network are low priority, statically allocating a set of resources for wireless devices that are not involved in communication (i.e., no high priority users currently in the network) is not necessary. Thus, all current users may have access to all the pooled resources. When a wireless device with a higher priority transmits, the network may modify the D2D resource pool configuration to make available a pool with prioritized resources. This may limit the resources available for the low priority users.

Figure 2:
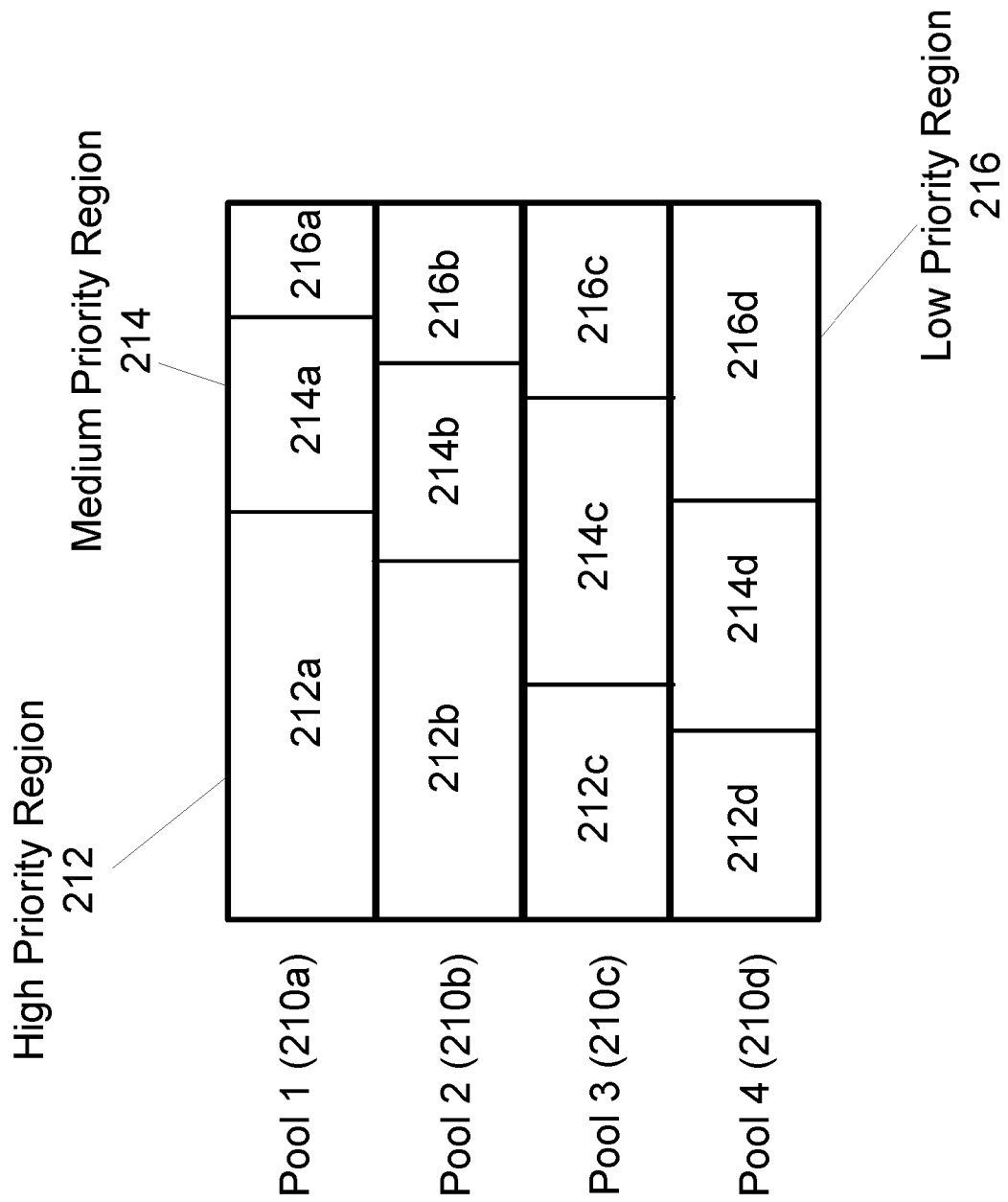
FIG. 2 is a block diagram illustrating an example resource pool configuration, according to a particular embodiment.

FIG. 2 is a block diagram illustrating an example resource pool configuration, according to a particular embodiment. The set of resources allocated for D2D communication includes four D2D resource pools 210 (i.e., 210a, 210b, 210c, and 210d). Each D2D resource pool 210 includes time, frequency, and/or any other suitable resources allocated for D2D communication.

D2D resource pools 210 are divided into three priority levels (high priority region 212, medium priority region 214, and low priority region 216). High priority region 212 comprises D2D resources reserved for high priority groups or devices. Medium priority region 214 comprises D2D resources reserved for medium priority groups or devices. Low priority region 216 comprises D2D resources reserved for low priority groups or devices.

In the illustrated example, each region comprises at least one D2D resource from each D2D resource pool 210. For example, high priority region 212 comprises D2D resources 212a from pool 210a, D2D resources 212b from pool 210b, D2D resources 212c from pool 210c, and D2D resources 212d from pool 210d. Medium priority region 214 comprises D2D resources 214a from pool 210a, D2D resources 214b from pool 210b, D2D resources 214c from pool 210c, and D2D resources 214d from pool 210d. Low priority region 216 comprises D2D resources 216a from pool 210a, D2D resources 216b from pool 210b, D2D resources 216c from pool 210c, and D2D resources 216d from pool 210d.

In some embodiments, more resources may be allocated to the groups or devices with higher priority. For example, high priority region 212 may have more combined D2D resources (i.e., 212a, 212b, 212c, and 212d) than medium priority region 214 and more than low priority region 216. Medium priority region 214 may have more combined D2D resources (i.e., 214a, 214b, 214c, and 214d) than low priority region 216.

In the illustrated example, D2D resource pool 210a and D2D resource pool 210b mainly serve the high priority groups or users. D2D resource pools 210a and 210b, however, include a relatively smaller portion of resources allocated to the groups with lower priorities (i.e., 214a and 216a in D2D resource pool 210a, and 214b and 216b in D2D resource pool 210b).

When a majority of the resources of a D2D resource pool are assigned to a region associated with a particular priority level, the priority level may be referred to as the primary priority level of the D2D resource pool. For example, the primary priority level of D2D resource pools 210a and 210b may be considered high priority.

D2D resource pool 210c and D2D resource pool 210d mainly serve groups or users with low and medium priorities. D2D resource pools 210c and 210d, however, also include a small number of D2D resources allocated to the high priority group (i.e., 212c in D2D resource pool 210c, and 212d in D2D resource pool 210d). D2D resource pool 210c may be considered to have a primary priority level of medium priority, and D2D resource pool 210d may be considered to have a primary priority level of low priority.

In particular embodiments, the network (e.g., an evolved UMTS Terrestrial Radio Access Network (E-UTRAN)) may define or predefine multiple resource pool configuration patterns. Each configuration may apply to a particular system load or mix of transmitting users (such as when out of coverage or off network). During a given time period, however, only one resource pool configuration is available for D2D resource selection.

Figure 3:
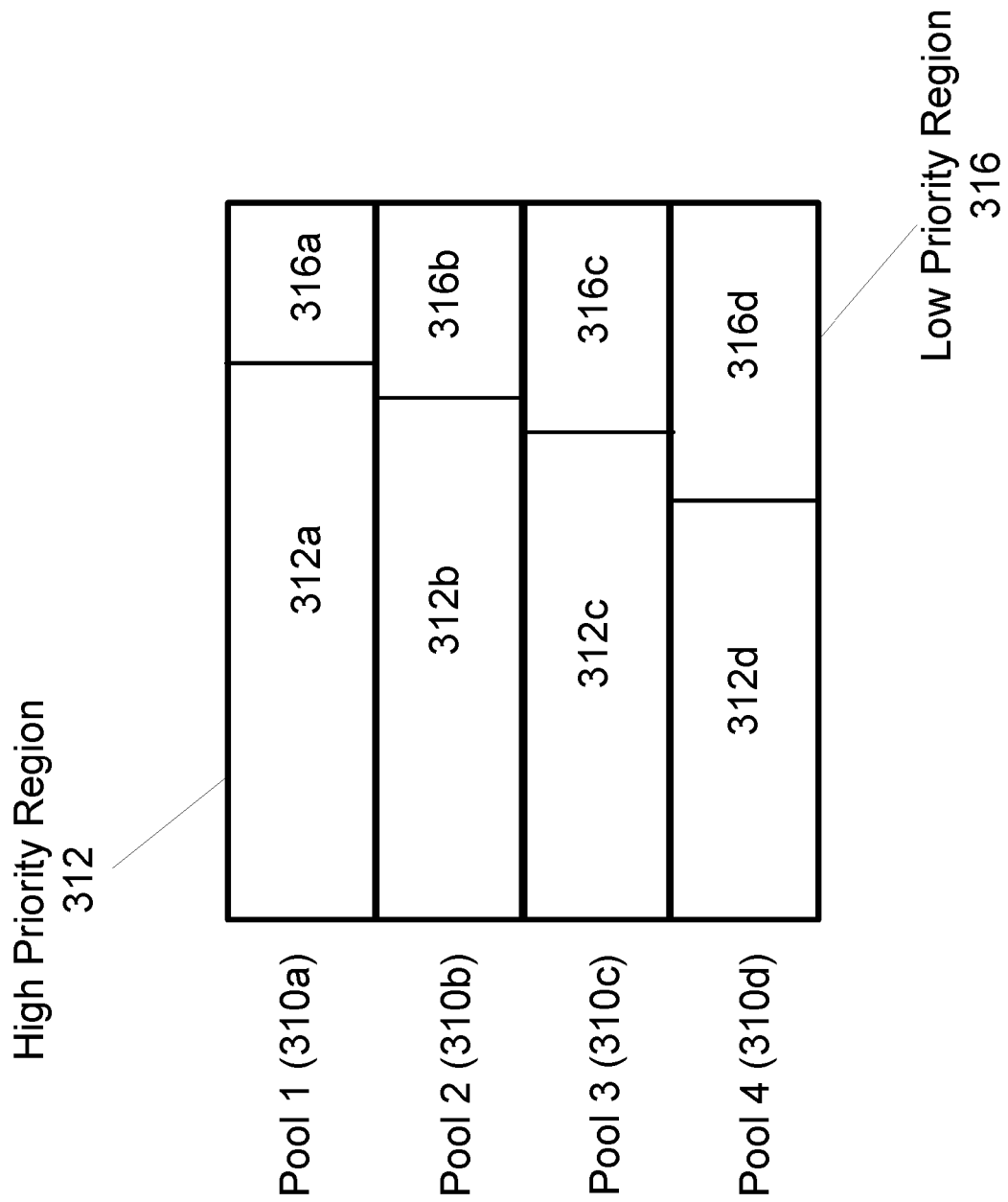
FIG. 3 is a block diagram illustrating another example resource pool configuration, according to a particular embodiment.

FIG. 3 is a block diagram illustrating another example resource pool configuration, according to a particular embodiment. The set of resources allocated for D2D communication includes four D2D resource pools 310 (i.e., 310a, 310b, 310c, and 310d) similar to pools 210 described with respect to FIG. 2. In this example, the geographical area in which the particular D2D groups or users are operating may only include high and low priority devices.

D2D resource pools 310 are divided into two priority levels (high priority region 312 and low priority region 316). High priority region 312 comprises D2D resources reserved for high priority groups or devices. Low priority region 316 comprises D2D resources reserved for low priority groups or devices.

In the illustrated example, each region comprises at least one D2D resource from each D2D resource pool 310. For example, high priority region 312 comprises D2D resources 312a from pool 310a, D2D resources 312b from pool 310b, D2D resources 312c from pool 310c, and D2D resources 312d from pool 310d. Low priority region 316 comprises D2D resources 316a from pool 310a, D2D resources 316b from pool 310b, D2D resources 316c from pool 310c, and D2D resources 316d from pool 310d.

In some embodiments, more resources may be allocated to the groups or devices with higher priority. For example, high priority region 312 may have more combined D2D resources (i.e., 312a, 312b, 312c, and 312d) than low priority region 316.

A particular advantage of this embodiment is that resources are not reserved, and thus wasted, for medium priority wireless devices when no medium priority wireless devices are transmitting in the network. The available resources may be reallocated among the high and low priority wireless devices.

Figure 4:
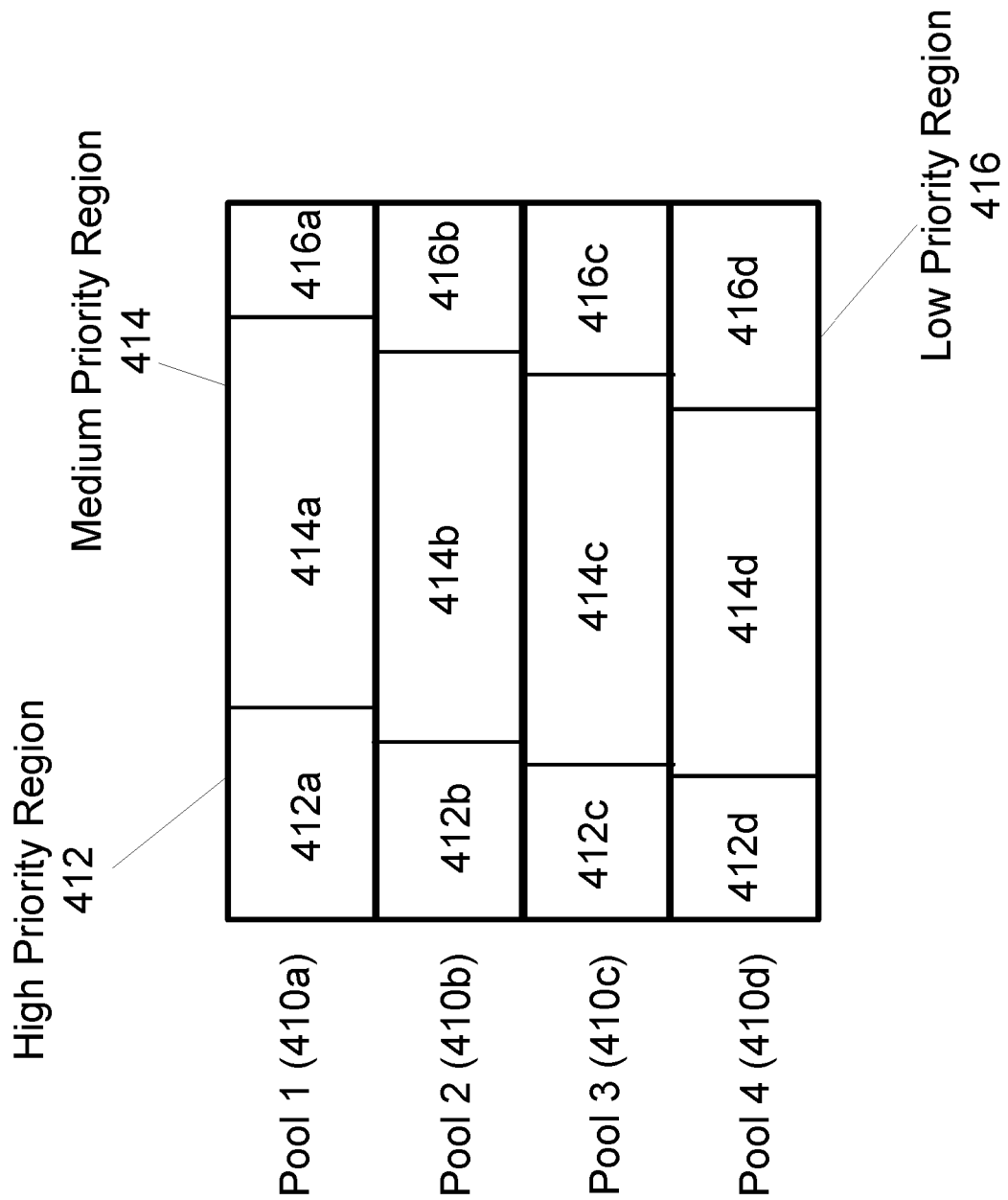
FIG. 4 is a block diagram illustrating another example resource pool configuration, according to a particular embodiment.

FIG. 4 is a block diagram illustrating another example resource pool configuration, according to a particular embodiment. The set of resources allocated for D2D communication includes four D2D resource pools 410 (i.e., 410a, 410b, 410c, and 410d) similar to pools 210 described with respect to FIG. 2. In this example, the geographical area in which the particular D2D groups or users are operating may be heavily loaded with medium priority devices.

D2D resource pools 410 are divided into three priority levels (high priority region 412, medium priority region 414, and low priority region 416). High priority region 412 comprises D2D resources reserved for high priority groups or devices. Medium priority region 414 comprises D2D resources reserved for medium priority groups or devices. Low priority region 416 comprises D2D resources reserved for low priority groups or devices.

In the illustrated example, each region comprises at least one D2D resource from each D2D resource pool 410. For example, high priority region 412 comprises D2D resources 412a from pool 410a, D2D resources 412b from pool 410b, D2D resources 412c from pool 410c, and D2D resources 412d from pool 410d. Medium priority region 414 comprises D2D resources 414a from pool 410a, D2D resources 414b from pool 410b, D2D resources 414c from pool 410c, and D2D resources 414d from pool 410d. Low priority region 416 comprises D2D resources 416a from pool 410a, D2D resources 416b from pool 410b, D2D resources 416c from pool 410c, and D2D resources 416d from pool 410d.

This example may apply to a situation in which many groups or users with medium priority want to communicate, and the other groups or users in the same area have other priority levels that require relatively fewer resources. In particular embodiments, more resources may be allocated to the groups or devices with medium priority. For example, medium priority region 414 may have more combined D2D resources (i.e., 414a, 414b, 414c, and 414d) than high priority region 412 and more than low priority region 416.

Although the illustrated embodiments depict each region with at least one D2D resource from each D2D resource pool, in other embodiments, some regions may not include any resources from some D2D resource pools, or some D2D resource pools may be allocated to a single region. Similarly, the illustrated embodiments depict regions comprising different percentages of resources from each D2D resource pool, however, other embodiments may include the same percentage of resources from each D2D resource pool, or a D2D resource pool may allocate resources equally among any number of regions.

In particular embodiments, a network node or wireless device (such as when out-of-coverage or off-network) may dynamically modify the division of D2D resources (e.g., select a different configuration) based on preconfigured rules. For example, a particular D2D resource pool configuration may be selected or modified based on the activity of a group of high priority users. In one example, the network may select the configuration depicted in FIG. 4 if the high priority group is lightly loaded and the medium priority group is heavily loaded. After some time, if the network determines that the network is highly loaded by the high priority group devices, the network may select the configuration depicted in FIG. 2 or 3. In particular embodiments the preconfigured rule may include a load threshold and switching configurations may be based on comparing a load to the load threshold.

In some embodiments, particular configuration patterns may be preconfigured in the wireless devices for when the devices are operating out-of-coverage or off-network. A network node may provide particular configuration patterns to a wireless device while the wireless device is within coverage or on-network.

For example, in some embodiments a network node may broadcast information on what D2D resources to use in a particular System Information Block (SIB). Particular embodiments may use a D2D SIB. A wireless device may store the patterns for use later on when it is out-of-coverage or off-network.

For out-of-coverage or off-network wireless devices, in some embodiments the wireless device may detect activity within a group and choose a suitable configuration based on the activity. The activity detection may be based on a group member discovery procedure or triggered by other metrics. For example, if the wireless device receives transmissions from a wireless device with a higher priority, if the wireless device experiences a long delay to transmit D2D data, or if the wireless device experiences a high collision rate when using a resource from the group, then the wireless device may determine that its associated priority group may be congested. The wireless device may attempt to alleviate the congestion by switching to another resource pool configuration.

A group of wireless devices participating in D2D communication may typically all be within listening range of each other. In particular embodiments, a transmitting wireless device that has determined to change D2D resource pool configuration may send a scheduling assignment that includes information on what resources to use to receive data from the wireless device. By listening to ongoing communication, the other wireless devices in the group may determine which wireless device is transmitting and the priority of the wireless devices. In some embodiments, if multiple wireless devices with different priorities are transmitting, then the wireless devices may use preconfigured rules to resolve the disparity for the group and/or to help a particular wireless device to select the correct resources to use for the next transmission.

Figure 5:
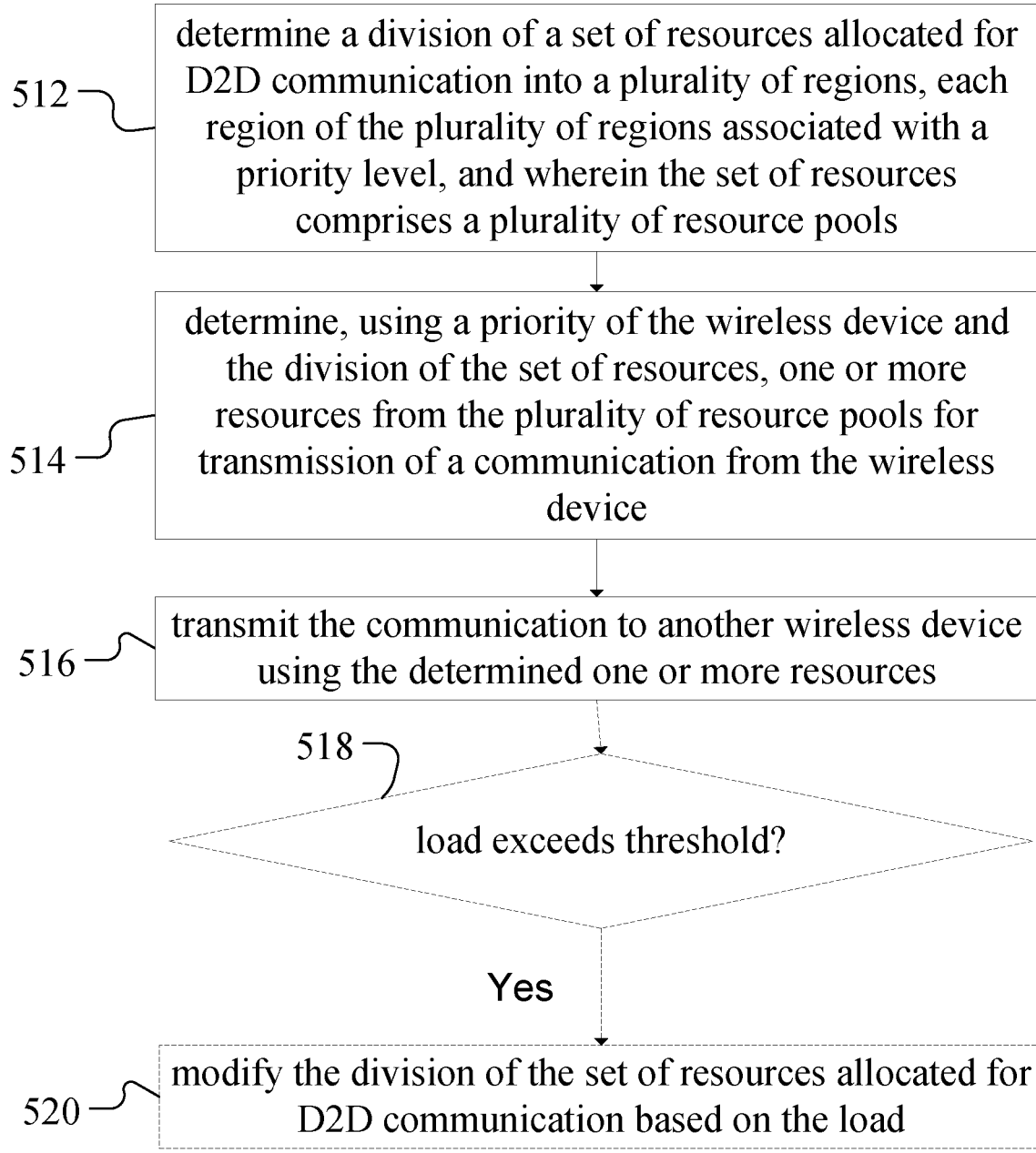
FIG. 5 is a flow diagram illustrating an example method in a wireless device of D2D communication in a wireless communication network, according to a particular embodiment.

FIG. 5 is a flow diagram illustrating an example method in a wireless device of D2D communication in a wireless communication network, according to a particular embodiment. In particular embodiments, one or more steps of FIG. 5 may be performed by a wireless device 110 of wireless network 100 described with respect to FIG. 1.

At step 512, a wireless device determines a division of a set of resources allocated for D2D communication into a plurality of regions, each region of the plurality of regions associated with a priority level, and wherein the set of resources comprises a plurality of resource pools. For example, wireless device 110*a* may determine a division of a set of resources allocated for D2D communication into a plurality of regions according to any of the divisions described with respect to FIGS. 2-4. In particular embodiments, the wireless device may determine any suitable division of the set of resources.

In particular embodiments, the wireless device may autonomously determine the division of a set of resources allocated for D2D communication into a plurality of regions. For example, wireless device 110*a* may autonomously determine the division of the set of resources allocated for D2D communication into the plurality of regions when wireless device 110*a* is out-of-coverage of network node 120*a*.

In particular embodiments, the wireless device may include one or more predefined divisions of the set of resources. The wireless device may have received the one or more predefined divisions of the set of resources when previously within coverage of a network node.

In particular embodiments, the wireless device may dynamically determine the division of the set of resources allocated for D2D communication into the plurality of regions. The wireless device may detect network activity, such as detecting a network load, within a group and choose a suitable configuration based on the activity.

The activity detection, in some embodiments, may be based on a group member discovery procedure or triggered by other metrics. Other metrics may include receiving transmissions from a wireless device with a higher priority, experiencing a long delay to transmit D2D data, or experiencing a high collision rate when using a resource from the group. Based on the detected activity, the wireless device may determine a suitable division of the set of resources allocated for D2D communication.

In some embodiments, the wireless device may receive the division of the set of resources allocated for D2D communication from a network node. For example, network node 120*a* may communicate, via signaling or any other suitable communication channel, to wireless device 110*a* the division of the set of resources allocated for D2D communication.

At step 514, the wireless device determines, using a priority of the wireless device and the division of the set of resources, one or more resources from the plurality of resource pools for transmission of a communication from the wireless device. For example, at previous step 512, wireless device 110*a* may have determined to use the division of the set of resources according to the example depicted in FIG. 2. At step 514, wireless device 110*a* may determine its own priority to be a medium priority. Based on its medium priority, wireless device 110*a* may use the available resources from medium priority region 214 (i.e., D2D resources 214*a* from pool 210*a*, D2D resources 214*b* from pool 210*b*, D2D resources 214*c* from pool 210*c*, or D2D resources 214*d* from pool 210*d*).

At step 516, the wireless device transmits the communication to another wireless device using the determined one or more resources. For example, wireless device 110*a* may transmit the communication to wireless device 110*b* using one or more of the resources from medium priority region 214.

At optional step 518, the wireless device may determine whether a network load exceeds a threshold. For example, wireless device 110*a* may use any of the methods for detecting network activity described with respect to step 514 and compare the network activity (load) to a threshold.

In particular embodiments the threshold may be associated with a priority level. A threshold may be relative to total network load, or relative to another priority level. For example, if the load associated with any priority level exceeds 60 percent of the total network load, then the 60 percent threshold is exceeded. As another example, if the high priority load exceeds the medium priority load by 40 percent, then the 40 percent threshold is exceeded. In particular embodiments, load may be determined by the amount of resources in use from each region of the D2D resource pools.

In particular embodiments, exceeding a threshold may include network activity below a particular load. For example, if the high priority load drops below a threshold of 5 percent, the 5 percent threshold may be exceeded.

In other embodiments, the wireless device may receive a notification from a network node that a threshold has been exceeded. For example, wireless device 110*a* may receive a notification from network node 120*a* that only 5 percent of the D2D resources in high priority region 212 have been used in the previous 10 minutes.

If the wireless device determines that the threshold is exceeded, then the method continues to step 520 where the wireless device modifies the division of the set of resources allocated for D2D communication based on the load. For example, in the previous step wireless device 110*a* may have determined that the load associated with the medium priority traffic exceeded a threshold. Wireless device 110*a* may modify the division of the set of resources allocated for D2D communication from the example depicted in FIG. 2 to the example depicted in FIG. 4, which allocates more resources for medium priority traffic, based on the exceeded threshold.

Modifications, additions, or omissions may be made to method 500. Additionally, one or more steps in method 500 of FIG. 5 may be performed in parallel or in any suitable order.

In method 500, the wireless device determined the division of the set of resources allocated for D2D communication. In some embodiments, a network node may determine the division of the set of resources allocated for D2D communication and communicate the determination to the wireless device.

Figure 6:
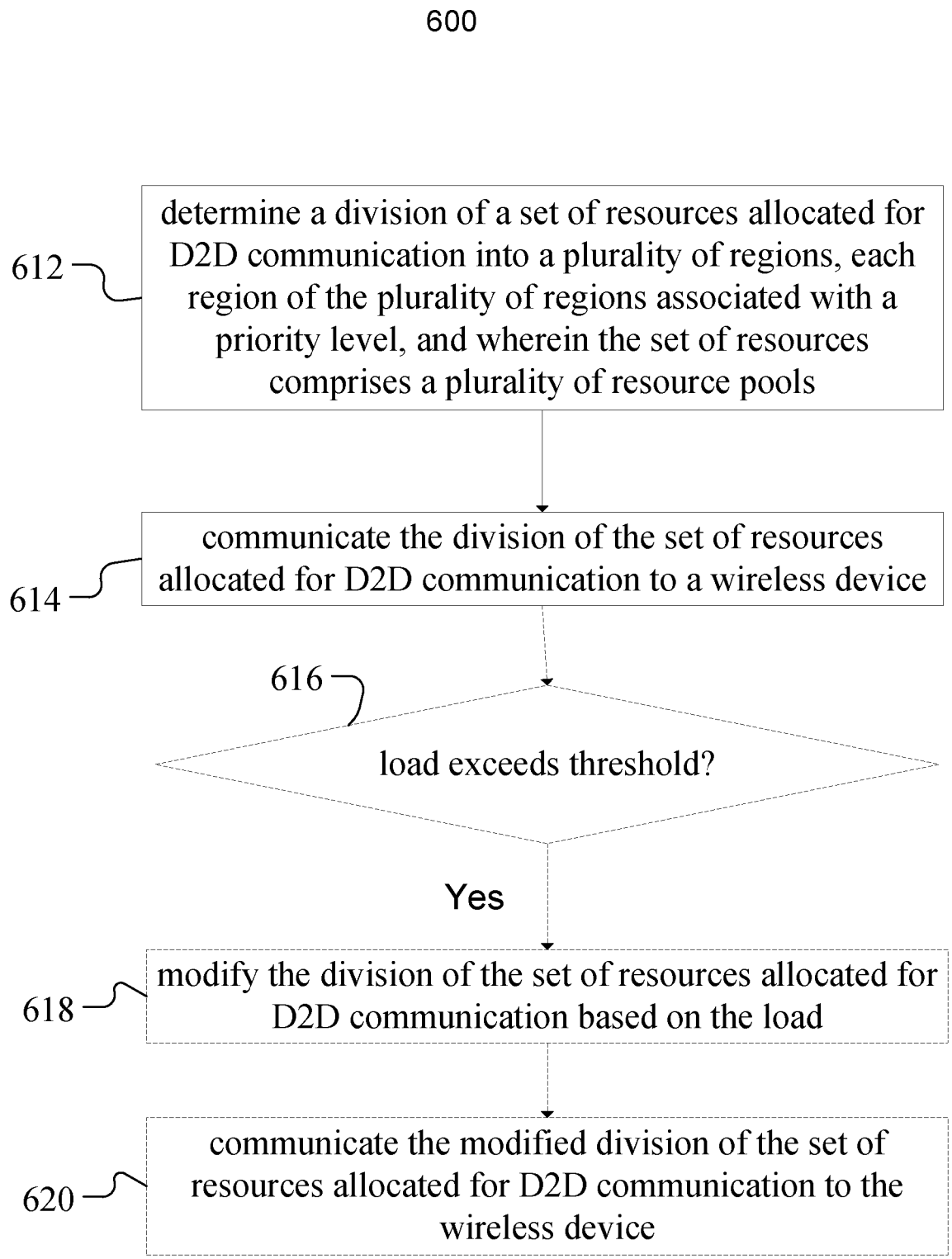
FIG. 6 is a flow diagram illustrating an example method in a network node of facilitating D2D communication in a wireless communication network, according to a particular embodiment.

FIG. 6 is a flow diagram illustrating an example method in a network node of facilitating D2D communication in a wireless communication network, according to a particular embodiment. In particular embodiments, one or more steps of FIG. 6 may be performed by a network node 120 of wireless network 100 described with respect to FIG. 1.

At step 612, a network node determines a division of a set of resources allocated for D2D communication into a plurality of regions, each region of the plurality of regions associated with a priority level, and wherein the set of resources comprises a plurality of resource pools. For example, network node 120*a* may determine a division of a set of resources allocated for D2D communication into a plurality of regions according to any of the divisions described with respect to FIGS. 2-4. In particular embodiments, the network node may determine any suitable division of the set of resources.

At step 614, the network node communicates the division of the set of resources allocated for D2D communication to a wireless device. For example, network node 120*a* may communicate the configuration depicted in FIG. 2 to wireless device 110*a*.

At optional step 616, the network node may determine whether a network load exceeds a threshold. For example, network node 120a may determine whether a network load associated with one or more priority levels exceeds a threshold.

If the network node determines that the threshold is exceeded, then the method continues to step 618 where the network node modifies the division of the set of resources allocated for D2D communication based on the load. For example, in the previous step network node 120a may have determined that a load associated with medium priority traffic was below a threshold. Network node 120a may modify the division of the set of resources allocated for D2D communication from the example depicted in FIG. 2 to the example depicted in FIG. 3, which does not allocated resources for medium priority traffic, based on the exceeded threshold.

At optional step 620, the network node communicates the modified division of the set of resources allocated for D2D communication to the wireless device. For example, network node 120a may communicate the configuration depicted in FIG. 3 to wireless device 110a.

Modifications, additions, or omissions may be made to method 600. Additionally, one or more steps in method 600 of FIG. 6 may be performed in parallel or in any suitable order.

Figure 7A:
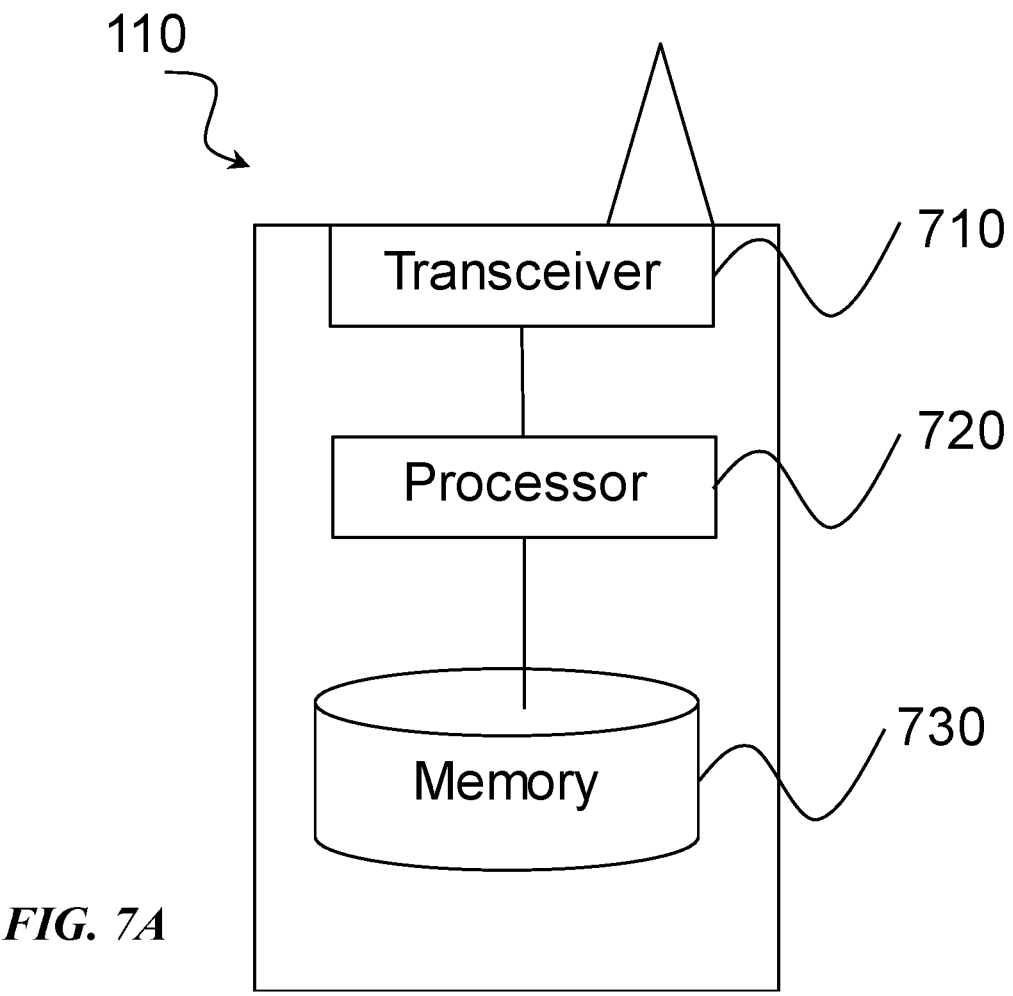
FIG. 7A is a block diagram illustrating an example embodiment of a wireless device.

FIG. 7A is a block diagram illustrating an example embodiment of a wireless device. The wireless device is an example of the wireless devices 110 illustrated in FIG. 1. The wireless device is capable of determining a division of a set of resources allocated for D2D communication into a plurality of regions. Each region of the plurality of regions is associated with a priority level, and the set of resources comprises a plurality of resource pools. The wireless device is capable of determining, using a priority level of the wireless device and the division of the set of resources, one or more resources from the plurality of resource pools for transmission of a communication. The wireless device is also capable of transmitting the communication to a second wireless device using the determined one or more resources.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 710, processor 720, and memory 730. In some embodiments, transceiver 710 facilitates transmitting wireless signals to and receiving wireless signals from wireless network node 120 (e.g., via an antenna), processor 720 executes instructions to provide some or all of the functionality described herein as provided by the wireless device, and memory 730 stores the instructions executed by processor 720.

Processor 720 includes any suitable combination of hardware and software implemented in one or more integrated circuits or modules to execute instructions and manipulate data to perform some or all of the described functions of the wireless device. In some embodiments, processor 720 may include, for example, one or more computers, one more programmable logic devices, one or more central processing units (CPUs), one or more microprocessors, one or more applications, and/or other logic, and/or any suitable combination of the preceding. Processor 720 may include analog and/or digital circuitry configured to perform some or all of the described functions of wireless device 110. For example, processor 720 may include resistors, capacitors, inductors, transistors, diodes, and/or any other suitable circuit components.

Memory 730 is generally operable to store computer executable code and data. Examples of memory 730 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 720 in communication with transceiver 710 determines a division of a set of resources allocated for D2D communication into a plurality of regions; determines, using a priority level of the wireless device and the division of the set of resources, one or more resources for transmission of a communication; and transmits the communication to a second wireless device using the determined one or more resources.

Other embodiments of the wireless device may include additional components (beyond those shown in FIG. 7A) responsible for providing certain aspects of the wireless device's functionality, including any of the functionality described above and/or any additional functionality (including any functionality necessary to support the solution described above).

Figure 7B:
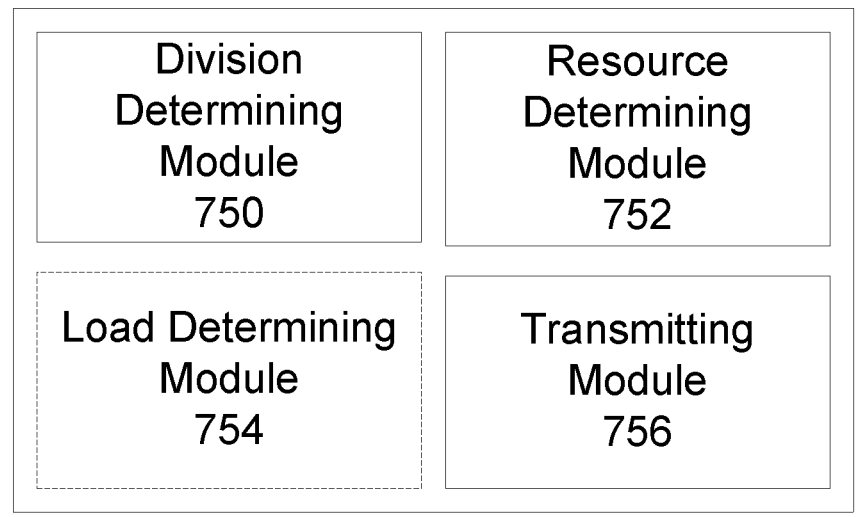
FIG. 7B is a block diagram illustrating example components of a wireless device.

FIG. 7B is a block diagram illustrating example components of a wireless device 110. The components may include division determining module 750, resource determining module 752, load determining module 754, and transmitting module 756.

Division determining module 750 may perform the division determining functions of wireless device 110. For example, division determining module 750 may determine a division of a set of resources allocated for D2D communication into a plurality of regions. Each region of the plurality of regions is associated with a priority level, and the set of resources comprises a plurality of resource pools. In certain embodiments, division determining module 750 may include or be included in processor 720. In particular embodiments, division determining module 750 may communicate with resource determining module 752, load determining module 754, and transmitting module 756.

Resource determining module 752 may perform the resource determining functions of wireless device 110. For example, resource determining module 752 may determine, using a priority of the wireless device and the division of the set of resources, one or more resources from the plurality of resource pools for transmission of a communication. In certain embodiments, resource determining module 752 may include or be included in processor 720. In particular embodiments, resource determining module 752 may communicate with division determining module 750, load determining module 754, and transmitting module 756.

Load determining module 754 may perform the load determining functions of wireless device 110. For example, load determining module 754 may determine that a load associated with the set of resources allocated for D2D communication exceeds a threshold. In certain embodiments, load determining module 754 may include or be included in processor 720. In particular embodiments, load determining module 754 may communicate with division determining module 750, resource determining module 752, and transmitting module 756.

Transmitting module 756 may perform the transmitting functions of wireless device 110. For example, transmitting module 756 may transmit communications to wireless device 110. In certain embodiments, transmitting module 756 may include or be included in processor 720. Transmitting module 756 may include circuitry configured to transmit radio signals. In particular embodiments, transmitting module 756 may communicate with division determining module 750, resource determining module 752, and load determining module 754.

Figure 8A:
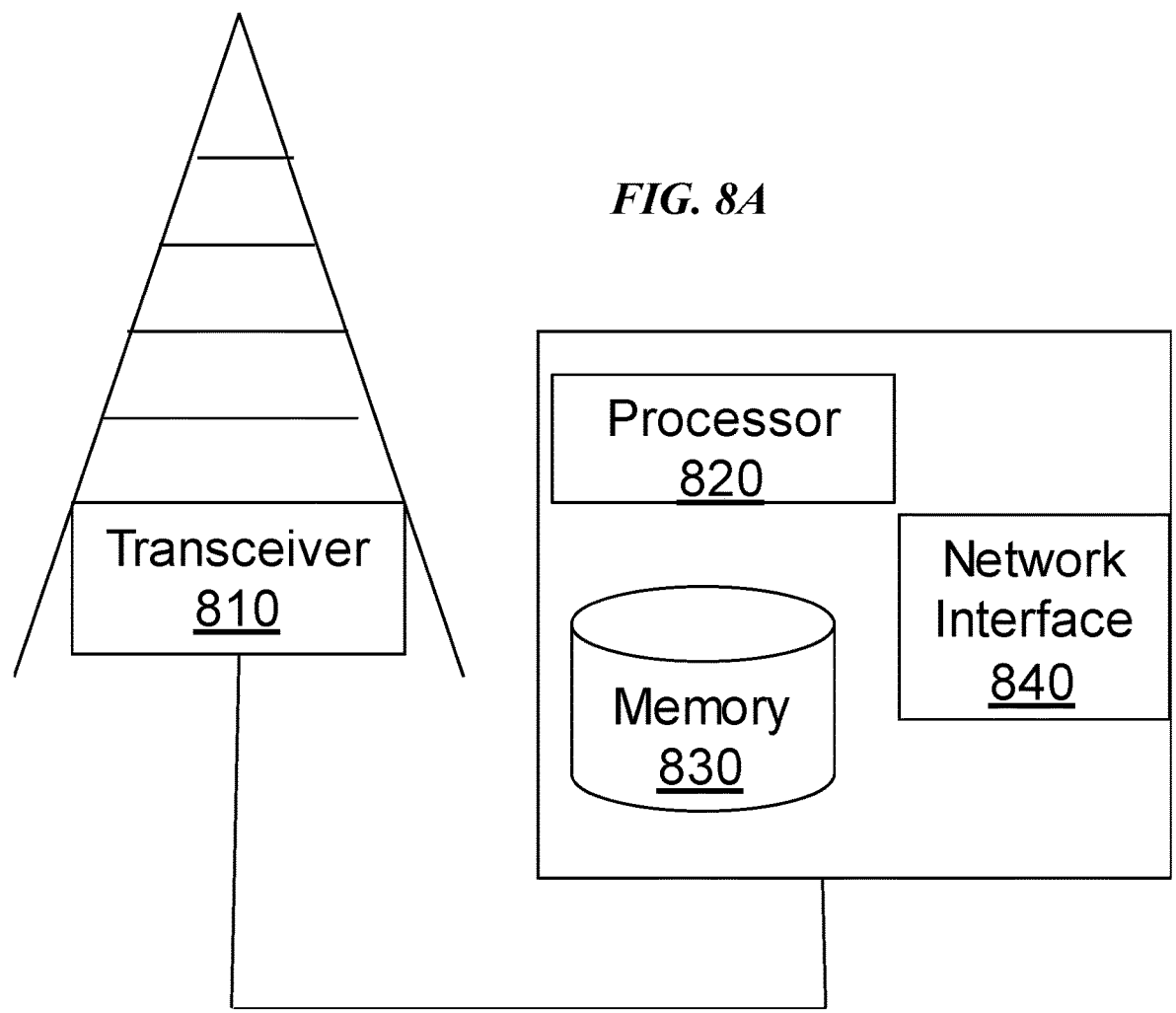
FIG. 8A is a block diagram illustrating an example embodiment of a network node.

FIG. 8A is a block diagram illustrating an example embodiment of a network node. The network node is an example of the network node 120 illustrated in FIG. 1. The network node is capable of determining a division of a set of resources allocated for D2D communication into a plurality of regions. Each region of the plurality of regions is associated with a priority level, and the set of resources comprises a plurality of resource pools. The network node is capable of communicating the division of the set of resources allocated for D2D communication to a wireless device.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 810, at least one processor 820, at least one memory 830, and at least one network interface 840. Transceiver 810 facilitates transmitting wireless signals to and receiving wireless signals from a wireless device, such as wireless devices 110 (e.g., via an antenna); processor 820 executes instructions to provide some or all of the functionality described above as being provided by a network node 120; memory 830 stores the instructions executed by processor 820; and network interface 840 communicates signals to backend network components, such as a gateway, switch, router, Internet, Public Switched Telephone Network (PSTN), controller, and/or other network nodes 120. Processor 820 and memory 830 can be of the same types as described with respect to processor 720 and memory 730 of FIG. 7A above.

In some embodiments, network interface 840 is communicatively coupled to processor 820 and refers to any suitable device operable to receive input for network node 120, send output from network node 120, perform suitable processing of the input or output or both, communicate to other devices, or any combination of the preceding. Network interface 840 includes appropriate hardware (e.g., port, modem, network interface card, etc.) and software, including protocol conversion and data processing capabilities, to communicate through a network.

In particular embodiments, processor 820 in communication with transceiver 810 determines a division of a set of resources allocated for D2D communication into a plurality of regions, and communicates the division of the set of resources allocated for D2D communication to a wireless device.

Other embodiments of network node 120 include additional components (beyond those shown in FIG. 8A) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 8B:
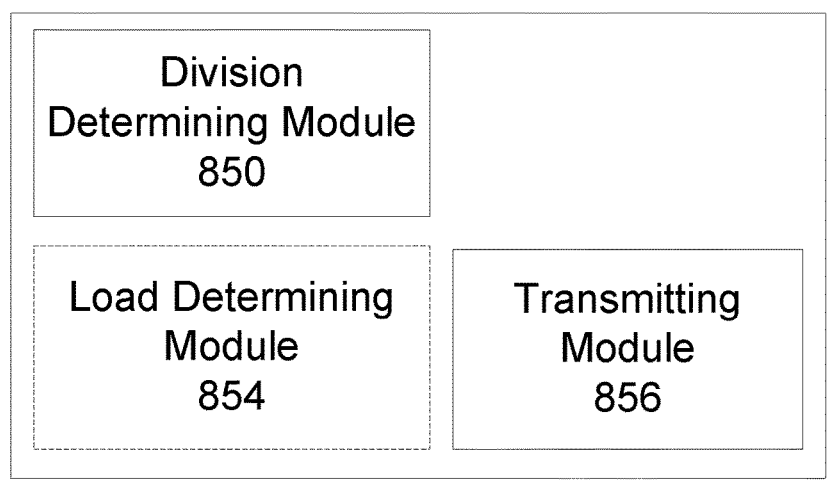
FIG. 8B is a block diagram illustrating example components of a network node.

FIG. 8B is a block diagram illustrating example components of a network node 120. The components may include division determining module 850, load determining module 854, and transmitting module 856.

Division determining module 850 may perform the division determining functions of network node 120. For example, division determining module 850 may determine a division of a set of resources allocated for D2D communication into a plurality of regions. Each region of the plurality of regions is associated with a priority level, and the set of resources comprises a plurality of resource pools. In certain embodiments, division determining module 850 may include or be included in processor 820. In particular embodiments, division determining module 850 may communicate with load determining module 854, and transmitting module 856.

Load determining module 854 may perform the load determining functions of network node 120. For example, load determining module 854 may determine that a load associated with the set of resources allocated for D2D communication exceeds a threshold. In certain embodiments, load determining module 854 may include or be included in processor 820. In particular embodiments, load determining module 854 may communicate with division determining module 850, and transmitting module 856.

Transmitting module 856 may perform the transmitting functions of network node 120. For example, transmitting module 856 may transmit communications to wireless device 110. In certain embodiments, transmitting module 856 may include or be included in processor 820. Transmitting module 856 may include circuitry configured to transmit radio signals. In particular embodiments, transmitting module 856 may communicate with division determining module 850, and load determining module 854.

Some embodiments of the disclosure may provide one or more technical advantages. As an example, in some embodiments the network may predictably control the prioritization and allocation of D2D communication and discovery resource pools. This facilitates a network node configuring D2D resources to satisfy a network operator's performance requirements. For example, dynamic configuration of pools maximizes the resources available for D2D communication. Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BSR Buffer Status Report
BTS Base Transceiver Station
D2D Device to Device
DRX Discontinuous Reception
eNB eNodeB
LTE Long Term Evolution
M2M Machine to Machine
MIMO Multi-Input Multi-Output
MTC Machine Type Communication
ProSe Proximity Services
PTT Push-To-Talk
RAN Radio Access Network
RAT Radio Access Technology
RRH Remote Radio Head
RRU Remote Radio Unit
UE User Equipment
WAN Wireless Access Network

The invention claimed is:

1. A method of device-to-device (D2D) communication in a wireless communication network, the method performed by a first wireless device and comprising:
identifying from a set of resources allocated for D2D communication a plurality of resource pools, each resource pool of the plurality of resource pools having a plurality of priority levels associated therewith;
selecting a resource pool from among the plurality of resource pools that has a priority level corresponding to a priority level of the first wireless device;
selecting one or more resources from the selected pool of resources for transmission of a communication from the first wireless device to a second wireless device; and
transmitting the communication to the second wireless device using the selected one or more resources.

2. The method of claim 1, wherein each priority level associated with a resource pool is associated with a sub set of resources within the resource pool.

3. The method of claim 2, wherein a number of resources of each sub set of resources is unequal.

4. The method of claim 1 wherein the same priority level is associated with multiple resource pools of the plurality of resource pools.

5. The method of claim 1, wherein identifying the plurality of resource pools comprises the first wireless device receiving from a network node information that can be used to identify the plurality of resources.

6. A wireless device capable of device-to-device (D2D) communication in a wireless communication network, the wireless device comprising:
a processor configured to:
identify from a set of resources allocated for D2D communication a plurality of resource pools, each resource pool of the plurality of resource pools having a plurality of priority levels associated therewith;
select a resource pool from among the plurality of resource pools that has a priority level corresponding to a priority level of the first wireless device; and
select one or more resources from the selected pool of resources for transmission of a communication from the first wireless device to a second wireless device; and
an interface configured to transmit the communication to the second wireless device using the selected one or more resources.

7. The wireless device of claim 6, wherein each priority level associated with a resource pool is associated with a sub set of resources within the resource pool.

8. The wireless device of claim 7, wherein a number of resources of each sub set of resources is unequal.

9. The wireless device of claim 6 wherein the same priority level is associated with multiple resource pools of the plurality of resource pools.

10. The wireless device of claim 6, wherein the processor is further configured to identify the plurality of resource pools based on information received from a network node the that can be used to identify the plurality of resources, the information received from the interface.

* * * * *